US011363826B2

(12) United States Patent
Bird et al.

(10) Patent No.: US 11,363,826 B2
(45) Date of Patent: Jun. 21, 2022

(54) METHOD AND APPARATUS FOR THE MANUFACTURE OF A FROZEN PRODUCT

(71) Applicant: 24KICE LTD, London (GB)

(72) Inventors: Sean Bird, Middlesex (GB); Hannah Bird, Middlesex (GB)

(73) Assignee: 24KICE LTD, London (GB)

( * ) Notice: Subject to any disclaimer, the term of this patent is extended or adjusted under 35 U.S.C. 154(b) by 810 days.

(21) Appl. No.: 15/544,586

(22) PCT Filed: Jan. 20, 2016

(86) PCT No.: PCT/GB2016/050122
§ 371 (c)(1),
(2) Date: Jul. 19, 2017

(87) PCT Pub. No.: WO2016/116750
PCT Pub. Date: Jul. 28, 2016

(65) Prior Publication Data
US 2018/0000115 A1    Jan. 4, 2018

(30) Foreign Application Priority Data

Jan. 20, 2015  (EP) .................................. 15151868

(51) Int. Cl.
*A23G 9/44*    (2006.01)
*A23G 9/10*    (2006.01)
*A23G 9/42*    (2006.01)

(52) U.S. Cl.
CPC ................. *A23G 9/44* (2013.01); *A23G 9/10* (2013.01); *A23G 9/42* (2013.01); *A23V 2002/00* (2013.01)

(58) Field of Classification Search
None
See application file for complete search history.

(56) References Cited

U.S. PATENT DOCUMENTS

| 4,538,427 A | * | 9/1985 | Cavalli | ................... F25D 11/00 |
| | | | | 62/342 |
| 4,632,566 A | * | 12/1986 | Masel | .................... A23G 9/163 |
| | | | | 366/102 |

(Continued)

FOREIGN PATENT DOCUMENTS

| EP | 0808576 A1 | 11/1997 |
| GB | 668622 A1 | 3/1952 |

(Continued)

OTHER PUBLICATIONS

Delafee, "Gold Ice Cubes", Jul. 18, 2013. Retrieved on Sep. 16, 2019. Retrieved from Internet URL: https://web.archive.org/web/20130718003441/http://www.delafee.com/gold-ice-cubes/View/Product/en/>. (Year: 2013).*

(Continued)

*Primary Examiner* — Stephanie A Cox
(74) *Attorney, Agent, or Firm* — Smith IP Services, P.C.

(57) ABSTRACT

A method for producing a frozen product including a solid matrix throughout which particulates are distributed using an apparatus including at least one compartment which is rotatable about an axis. The method can include the steps of adding to the compartment a liquid to be frozen to form the matrix and particulates to be distributed therein, reducing the temperature around the compartment to a temperature below the freezing point of the liquid, rotating the compartment about the axis while at least some of the liquid freezes within the compartment trapping at least some of the particulates within the frozen matrix and removing the frozen product from the compartment.

16 Claims, 5 Drawing Sheets

(56) References Cited

U.S. PATENT DOCUMENTS

| | | | | |
|---|---|---|---|---|
| 5,048,724 A | * | 9/1991 | Thomas | A23G 3/28 |
| | | | | 222/105 |
| 2003/0068409 A1 | * | 4/2003 | Binley | A23G 9/285 |
| | | | | 426/101 |
| 2003/0183090 A1 | * | 10/2003 | Binley | A23G 9/224 |
| | | | | 99/455 |
| 2004/0247747 A1 | * | 12/2004 | Jones | A23G 9/282 |
| | | | | 426/101 |
| 2011/0259037 A1 | * | 10/2011 | McCollough | F25C 5/04 |
| | | | | 62/345 |
| 2013/0156944 A1 | | 6/2013 | Miller | |

FOREIGN PATENT DOCUMENTS

| | | | | |
|---|---|---|---|---|
| GB | 847207 A | | 9/1960 | |
| WO | 2006094575 A1 | | 9/2006 | |
| WO | 2012080282 A1 | | 6/2012 | |
| WO | WO-2012080282 A1 | * | 6/2012 | A23G 9/24 |

OTHER PUBLICATIONS

PCT Search report dated Mar. 23, 2016 for PCT Patent Application No. PCT/GB2016/050122, 10 pages.

* cited by examiner

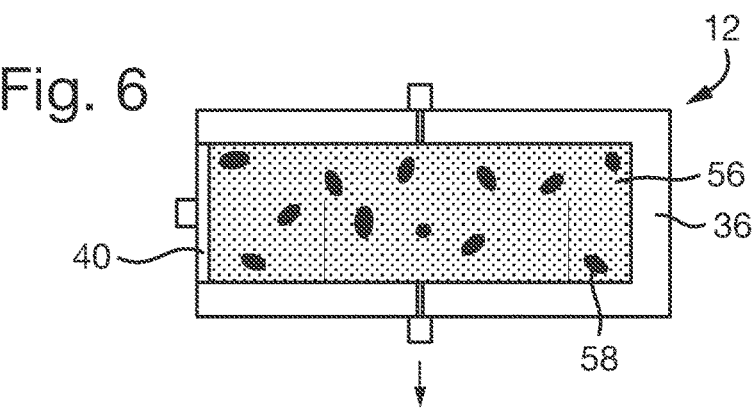
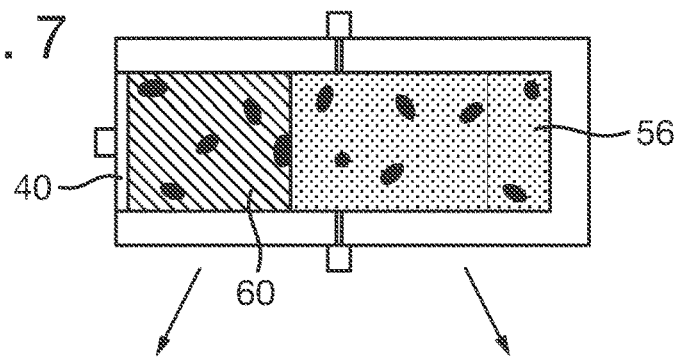
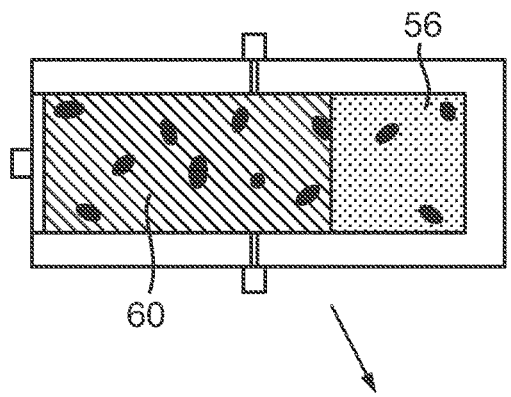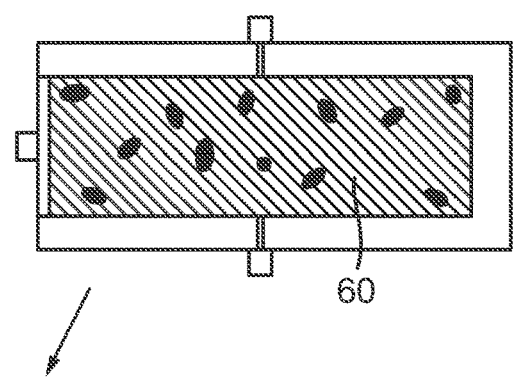
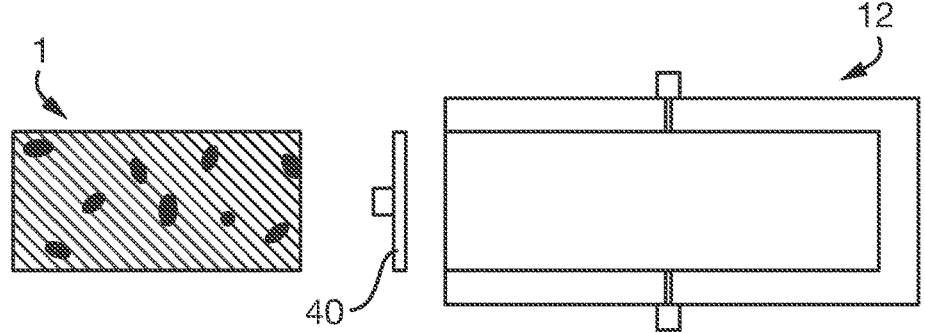

METHOD AND APPARATUS FOR THE MANUFACTURE OF A FROZEN PRODUCT

CROSS-REFERENCE TO RELATED APPLICATIONS

This application is a national stage under 35 USC 371 of International Application No. PCT/GB2016/050122, filed on 20 Jan. 2016, which claims the benefit of the filing date of European Application No. 15151868.5, filed on 20 Jan. 2015. The entire disclosures of these prior applications are incorporated herein by this reference.

The present invention relates to a method and apparatus for the manufacture of a frozen product and to a frozen product itself. The invention relates particularly to frozen water products which include metallic particulates for decorative, or other, reasons, but could be used for other liquids and particulate materials.

Frozen water, or ice, is often used as a cooling agent for food and drinks and it is common to have blocks of ice, for example cubes, spheres or other shapes, provided in drinks. It has been suggested in the past that gold flakes could be used to make such blocks more aesthetically appealing to consumers and to release the gold flakes into a drink as the ice melts.

The manufacture of such ice products typically involves adding the particulates and water to a mould and putting the mould into the freezer until the water has frozen into ice. This can result in the particulates being in a layer on one side of the ice, either because they sink, or because they float, prior to freezing of the water. Modifying the water or particulate properties so that the particulates can be reliably suspended in the liquid may be possible in some cases, but this can be difficult to achieve and may not always be possible.

Applying the particulates to surfaces of the mould, or to the already frozen ice, can allow the particulates to be distributed in a surface layer of the ice, but this surface layer melts first and releases the particulates leaving plain ice. The ice could be frozen in layers, with each layer including additional particulates, but this is time consuming and the interfaces between the layers may render the ice opaque which may not be visually acceptable. These techniques can also be applied to other liquids.

It is an object of the present invention to provide a method and apparatus for the manufacture of a frozen product that addresses some of the problems mentioned above.

The invention provides a method of producing a frozen product comprising a solid matrix throughout which particulates are distributed using an apparatus comprising at least one compartment which is rotatable about an axis, the method comprising the steps of:
a) adding to the compartment a liquid to be frozen to form the matrix and particulates to be distributed therein;
b) reducing the temperature around the compartment to a temperature below the freezing point of the liquid;
c) rotating the compartment about the axis while at least some of the liquid freezes within the compartment trapping at least some of the particulates within the frozen matrix; and
d) removing the frozen product from the compartment.

By rotating the compartment about an axis during freezing of the liquid, the particulates are disturbed during the freezing process and settling, floating or aggregating of the particulates can be reduced. The disturbance may be due to flow, or eddy, currents generated within the liquid as a result of the rotation of the compartment, or may be due to gravity if the axis is transverse to the axis along which gravity acts. By preventing, or at least limiting the effects of positive or negative buoyancy of the particulates and the tendency of the particulates to clump together or aggregate, an enhanced distribution of the particulates throughout the frozen matrix can be achieved.

The axis about which the compartment is rotated may pass through the compartment or the compartment may be offset from the axis so that the compartment orbits about the axis during the rotation. The axis may be transverse to the direction along which gravity acts, may be within about 10° of being perpendicular to the direction along which gravity acts, or may be substantially perpendicular to the direction along which gravity acts.

The particulates may be any suitable particles that it is desired to distribute throughout the frozen matrix. The particulates may have substantially neutral buoyancy in the liquid such that they do not rise or fall through the liquid particularly quickly as this facilitates the production of a frozen product in which the particulates are distributed throughout the frozen matrix.

The compartment may be any suitable shape, for example the compartment may have a substantially circular, or substantially square, cross section. To facilitate removal of the frozen product from the compartment, the compartment may include a removable lid which closes or seals a compartment opening. The compartment may have a cross section which is substantially parallel, or tapering outwards, towards the opening so that a frozen product within the compartment can slide from the compartment through the opening to be removed from the compartment. Other ways of removing the product from the compartment are also possible and may be preferred if complicated product shapes are required. For example the compartment may take the form of a multi-section mould having walls that can be individually moved away from the product, or which are deformable to allow the product to be removed. The method may also include a step of warming the compartment walls which may facilitate removal of the frozen product from the compartment by melting an exterior layer of the frozen product.

The compartment may be sub-divided into sub-compartments having desired shapes and/or volumes using internal walls. The internal walls may define a plurality of substantially cubic sub-compartments. The internal walls may be removable from the compartment to facilitate extraction of the frozen product. The sub-division of the compartment also enhances control of the distribution of the particulates as a pre-determined quantity of particulates can be loaded into each sub-compartment to produce a desired effect. This means that a compartment can be used to create a plurality of frozen products each having a defined quantity of particulates therein. If used with directional freezing (discussed below) the internal walls can be used to define one or more sub-compartments near the freeze initiation wall that include particulates and one or more sub-compartments further from the freeze initiation wall which do not as it is expected that, with the liquid to be frozen, the sub-compartments at that distance from the freeze initiation wall may be cloudy.

The compartment may be bounded by one or more walls, including a freeze initiation wall. At least some of the walls may be insulated and the freeze initiation wall may be substantially uninsulated. It should be understood that the terms insulated and uninsulated used here are to be considered as relative to one another to provide the function of the freeze initiation wall. In use, the temperature around the compartment is reduced to below the freezing point of the liquid and by having insulated walls and an uninsulated freeze initiation wall the point, area, or region, of initiation of freezing of the liquid is controlled and the liquid within the compartment freezes from the freeze initiation wall along the compartment along a freeze path. The freeze path may be complex, particularly for a compartment having a complex shape, but is preferably substantially linear. The freeze path may form a freeze axis for a compartment in which the direction of freezing is substantially linear. The freeze axis may extend from substantially centrally within the freeze initiation wall and extend substantially along the centre of the compartment away from the freeze initiation wall. The freeze axis may be substantially parallel with the axis about which the compartment is rotated, or the freeze axis may differ from the axis about which the compartment is rotated by less than 45°, maybe less than 30° or possibly less than 10°. There may be a plurality of freeze initiation walls for one compartment if desired.

The insulation on the walls of the compartment may be removable. It may be desirable to adjust the rate at which heat can be lost from the uninsulated freeze initiation wall so that the temperature within the compartment does not drop too rapidly leading to low temperature fluid being transported by eddy currents and initiating freezing in unwanted locations. Such control over the rate of heat loss at the freeze initiation wall can be achieved, for example, by insulating the freeze initiation wall, or by altering the interaction of the air with the freeze initiation wall. Alter the interaction of the air with the freeze initiation wall may be achieved by arranging a shield spaced apart from exterior of the freeze initiation wall which serves to control the flow of air over the freeze initiation wall. For example the shield may form an air channel over the freeze initiation wall.

The process of controlling the initiation and direction of freezing using a freeze initiation wall is referred to herein as directional freezing because the direction of freezing is controlled and consistent within the compartment. The freeze initiation wall may be uninsulated which means that it may be sufficiently less insulated than the other, insulated, walls to ensure that freezing begins at the freeze initiation wall and not the others and that the frozen matrix grows along the compartment in a predictable manner. The amount of insulation required to achieve this control will vary depending upon various factors including the temperature to which the compartment is to be subjected, the liquid being frozen and the materials of the walls. The compartment wall could be formed from, for example a metal or plastics material and insulation added as required to the insulated regions, for example an insulated portion of the compartment may comprise a silicone rubber insulation material added to a compartment wall, for example the insulation may comprise a foam insulator, such as a closed cell, cross linked polyethylene foam. Such a foam insulator may be added at a thickness of about 30 mm to provide the insulated walls for a water based frozen product. It should be noted that the walls may be insulated simply by virtue of the material from which they are manufactured and the insulation need not be an additional element added to a wall, for example the uninsulated freeze initiation wall may be fabricated from the same material as the insulated walls, but the material may be thinned in the uninsulated region and therefore provide less insulation, or the insulated walls may be made from a plastics material and the freeze initiation wall from a metal such as steels or copper. In a compartment with a single freeze initiation wall the direction of freezing will typically be away from the freeze initiation wall along the compartment along a freeze axis. It should be noted that the process of directional freezing to produce substantially pure frozen products adjacent the freeze initiation wall can be used without rotation of the compartment and without particulates if desired.

In this way there is provided a method for producing a frozen product comprising a solid matrix using an apparatus comprising at least one compartment, the compartment being bounded by one or more walls, including a freeze initiation wall, at least some of the walls being insulated and the freeze initiation wall being substantially uninsulated, the method comprising the steps of:
 a) adding to the compartment a liquid to be frozen to form the matrix and particulates to be distributed therein;
 b) reducing the temperature around the compartment to a temperature below the freezing point of the liquid;
 c) allowing at least some of the liquid to freeze; and
 d) removing the frozen product from the compartment.

The freeze initiation wall may be a removable lid which closes and/or seals an opening of the compartment and which may be uninsulated.

The compartment may include one or more inlets, for example the opening which may be closed by a lid or an inlet valve through a wall, and may include one or more outlets, for example an air valve, or vent, through which air is allowed to escape, particularly during the process of adding liquid to the compartment. The inlets and outlets may be provided in opposing walls of the compartment, or in the same wall. A combined inlet and vent may be provided. The inlet and vent may be provided through the lid which closes the compartment.

The step of rotating the compartment about the axis may include rotating the compartment in a first direction about the axis, for example clockwise, for a first length of time and then rotating the compartment the opposite direction about the axis, for example anti-clockwise, for a second length of time. The first and second lengths of time could be predetermined, or could be randomly chosen and may or may not be equal in duration. The rotation may be controlled by an automated control device, for example a computing device or a timer device. The rotating in one or other direction may be repeated each period of time spent rotating may be followed or preceded by a period of time during which no rotation occurs. It should also be noted that the rotation need not be full rotations about then axis and rocking back and forth about the axis is also considered to be rotation about the axis first one way and then the other. It is also possible that the axis might move during the rotation of the compartment, for example the axis about which the compartment is being rotated might change orientation during such rotation. Such techniques are known for mixing laboratory samples, for example in roller mixers.

The rotation may occur at between 0.1 and 60 revolutions per minute, but rates of rotation outside this range are possible.

The compartment may be vibrated during the rotation step, or during other steps, for example during a period when the compartment is not rotating. Vibration during rotation could be achieved by using an offset coupling to a motor which drives the rotation.

The liquid to be added to the compartment may be viscosity adjusted prior to being added into the compartment. The viscosity adjustment might be carried out by cooling or heating the liquid prior to adding the liquid to the compartment, or may be by adding viscosity modifying additives to the liquid. By adjusting the viscosity of the liquid the rate at which particulates move through the liquid under the action of gravity or currents can be altered. Additives could also be added to the liquid to adjust the surface tension of the liquid to modify the behaviour of the particulates within the liquid if desired/required.

At least some of the particulates may include a coating to modify the overall density of the particulate from that of the base material of the particulate to more closely match the density of the liquid. For example, a particulate of a gold base material may be coated with a low density material to reduce the overall density of the particulate and thereby adjust the buoyancy of the particulate within the liquid. A coating could also be applied to some or all of the particulates to adjust interaction between the particulate and the liquid. For example if water is to be used as the liquid, the particulates could be coated with a hydrophobic or hydrophilic layer to alter the interaction between the particles and the water.

The method is appropriate for any liquid, although the low temperatures and/or high pressures required to freeze some liquids may be prohibitive. It is therefore preferred that the liquid which will form the matrix is a liquid at room temperature and pressure (about 20-25° C. and 1 bar) and freezes at a pressure of about 1 bar at a temperature above −100° C., preferably above −50° C., more preferably above −30° C. and most preferably above −5° C. Being liquid at room temperature and pressure means that no special handling is required for the liquid during the phase of adding the liquid to the compartment. The higher the freezing temperature of the liquid the less energy is required to cool and freeze the liquid from room temperature. Also there is a lower risk of injury from contact with the frozen product.

Preferred liquids include water, preferably purified, to remove or reduce dissolved minerals, water and alcohol based drinks, for example vodka or tequila. The freezing point of mixtures can be adjusted by varying the relative concentrations of the components of the mixture. The liquid may be substantially transparent, or at least translucent, as this increases the chances that the final product will be transparent, or at least some of that the particulates will be visible within the frozen product.

Purified water can be created by many methods including distillation, ion exchange, reverse osmosis, carbon filtering, microfiltration, ultrafiltration, ultraviolet oxidation, or electrodialysis. Such processes seek to reduce levels of impurities in the water. In the present invention it is preferred that, if water is to be the liquid, purified water is used as this reduces cloudiness of the final product.

The matrix formed by the frozen liquid may be transparent such that at least some of that the particulates will be visible within the frozen product, rather than only being visible when on the surface of the product.

The particulates can be made of any suitable material. The particulates preferably rise or fall under the action of gravity through the liquid at a rate of less than about 5 cm per minute, preferably less than 2 cm per minute and more preferably at less than 1 cm per minute as this facilitates distributing the particulates within the liquid. Rapid settling or rising is likely to require significant agitation by rotation or vibration to ensure that the particulates are not substantially solely distributed around the periphery of the compartment.

The particulates may have a maximum dimension of less than 10 mm, preferably less than 5 mm, as this facilitates the distribution of the particulates throughout the matrix as liquid viscosity and surface effects play a significant role in determining the rate at which the particulate moves through the liquid. Particularly preferred materials for the particulates include gold and silver leaf, other metallic leaf materials and other similar materials, metallic or otherwise as these can produce pleasing aesthetic effects. Particularly preferred materials for the particulates also include organic materials, such as the zest of citrus fruits such as lemon, lime or orange, herbs, spices or other flavoured materials, organic or otherwise.

There may be a combination of two or more types of particulate, for example flakes of gold and silver leaf. Such a combination may produce a pleasing visual effect.

The particulates and the liquid may both be made of edible materials as this means that the frozen product can be safely used to cool either food or drink products without a toxic risk to any consumers.

At least some of the particulates may have functional properties other than aesthetic, for example they may include one of more indicator substances that react with a target substance to produce a visual or other indication of the presence of the target substance. Such functional particulates may include an indicator substance that changes colour in the presence of a narcotic. If such particulates were used in a frozen ice product intended for use as a drink cooler, the indicator substance could indicate to a consumer if an unwanted narcotic had been added to their drink. Alternative non-aesthetic properties include pharmaceutically active particulates, health supplement particulates such as vitamins or minerals, flavour enhancing or altering particulates such as those already mentioned above. If the frozen product is to be used to cool a drink, the particulate may be readily soluble in the drink, or react with a component in the drink to provide a particular effect. If such solubility or reactivity is required then it is preferred that the particulate is substantially insoluble or substantially unreactive with the liquid which is to form the matrix of the frozen product.

Distributing such functional particulates throughout the frozen product ensures a sustained release of those particulates as the frozen product melts and can therefore be used to ensure that, while the product is still melting, it is likely that some particulate is being released.

The invention also provides an apparatus suitable for carrying out the method as described above, the apparatus comprising a compartment, a bracket, a drive shaft and a motor, the motor being coupled to the drive shaft such that the motor can cause rotation of the drive shaft, the compartment coupled to the bracket which can be driven by the drive shaft to cause the compartment to rotate about an axis.

The bracket and drive shaft may be integrally formed from a single piece of material and may incorporate some, or all, of the compartment.

The bracket may comprise an insulated disc to which the compartment is attached, possibly removably attached. The disc may be rotatable about a disc axis of the disc and thereby cause the attached compartment to also rotate about that disc axis. The apparatus may include a plurality of compartments attached, possibly removably, to the disc. The apparatus may include a plurality of such insulated discs, each of which includes at least one compartment attached thereto, possible removably.

The apparatus may include a freezer apparatus containing an enclosed volume, the temperature of which can be controlled to be below the freezing point of the liquid to be frozen. In use the filled compartment is placed inside the enclosed volume and rotated about the axis during freezing. The freezer compartment may be part of a known freezer apparatus, for example an electrically powered non-CFC based freezer apparatus.

The motor may be located outside of the enclosed volume of the freezer and the drive shaft may pass through a wall of the freezer to the bracket and compartment within the enclosed volume. The drive shaft may be made from an insulating material, for example a plastic, so that heat is not readily conducted into the enclosed volume.

The invention also provides a frozen product comprising a frozen matrix with particulates distributed substantially throughout the matrix. Such a product has not previously been possible, particularly with particulates that do not remain suspended within the liquid for a significant time.

The frozen matrix may by ice (frozen water) and at least some of the particulates may be made from one or more materials selected from the list comprising gold, silver, bronze, copper and imitation metals. Such particulates provide a pleasing decorative effect to the product. The particulates are preferably substantially non-toxic and so can be consumed safely in at least small quantities. The particulates may be in the form of a leaf, sheet, petal, dust, flake, designed shapes, letters and numbers. The term designed shapes here is used to mean a shape which is intended to represent something to a consumer.

As an example the frozen product may be ice (frozen water) in which particulates of gold or silver leaf are distributed.

It should be noted that as used herein the term frozen product refers to a product, the solid matrix of which, would be liquid at room temperature and pressure, but which has been cooled sufficiently to solidify the liquid. It would be expected that a frozen product according to the present invention would gradually melt at room temperature and pressure (about 20-25° C. and 1 bar).

The invention will now be described by way of example only with reference to the following figures in which:

FIGS. 6, 7, 8a, 8b and 9 show steps in a directional freezing process; and

Figure 1:
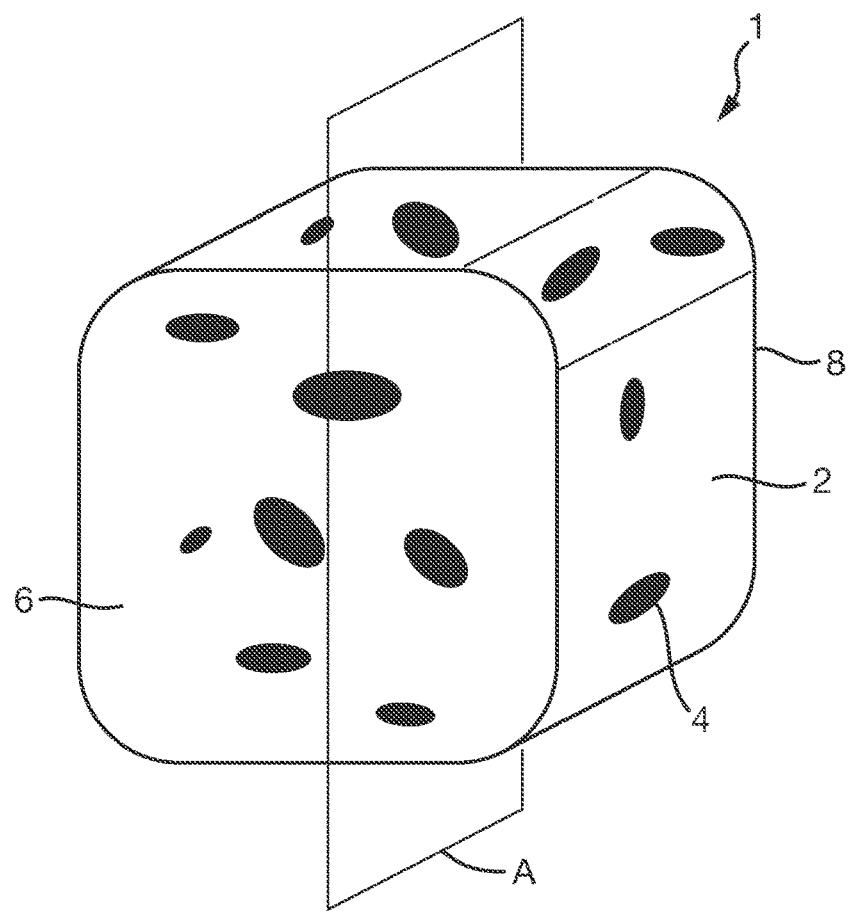
FIG. 1 shows a frozen product including particulates distributed throughout.

FIG. 1 shows a frozen product 1 comprising a solid matrix 2 of frozen liquid and particulates 4 distributed throughout the matrix 2. In this case the matrix 2 is made from purified drinking water and the particulates 4 include edible gold and silver leaf with a maximum dimension no larger than about 1 cm, preferably no larger than 0.5 cm. The frozen product 1 is substantially cube shaped and has a substantially uniform cross section from a front face 6 to a rear face 8 and particulates 4 are distributed substantially throughout the matrix 2. The particulates 4 are distributed substantially randomly throughout the matrix 2.

Figure 2:
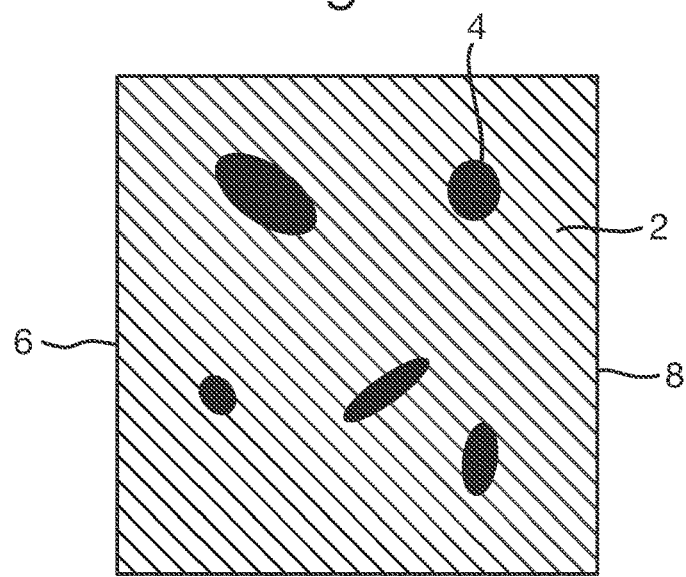
FIG. 2 shows a cross section through the frozen product of FIG. 1.

FIG. 2 shows a cross section through the frozen product 1 of FIG. 1 along the plane A shown in FIG. 1. The cross section shows the solid matrix 2 and the particulates and again shows that the particulates 4 are distributed throughout the solid matrix 2.

FIGS. 1 and 2 show a frozen product 1 within which particulates 4 are distributed substantially randomly throughout the matrix 2 with no layers, significant concentration gradient or orientation alignment.

Figure 3:
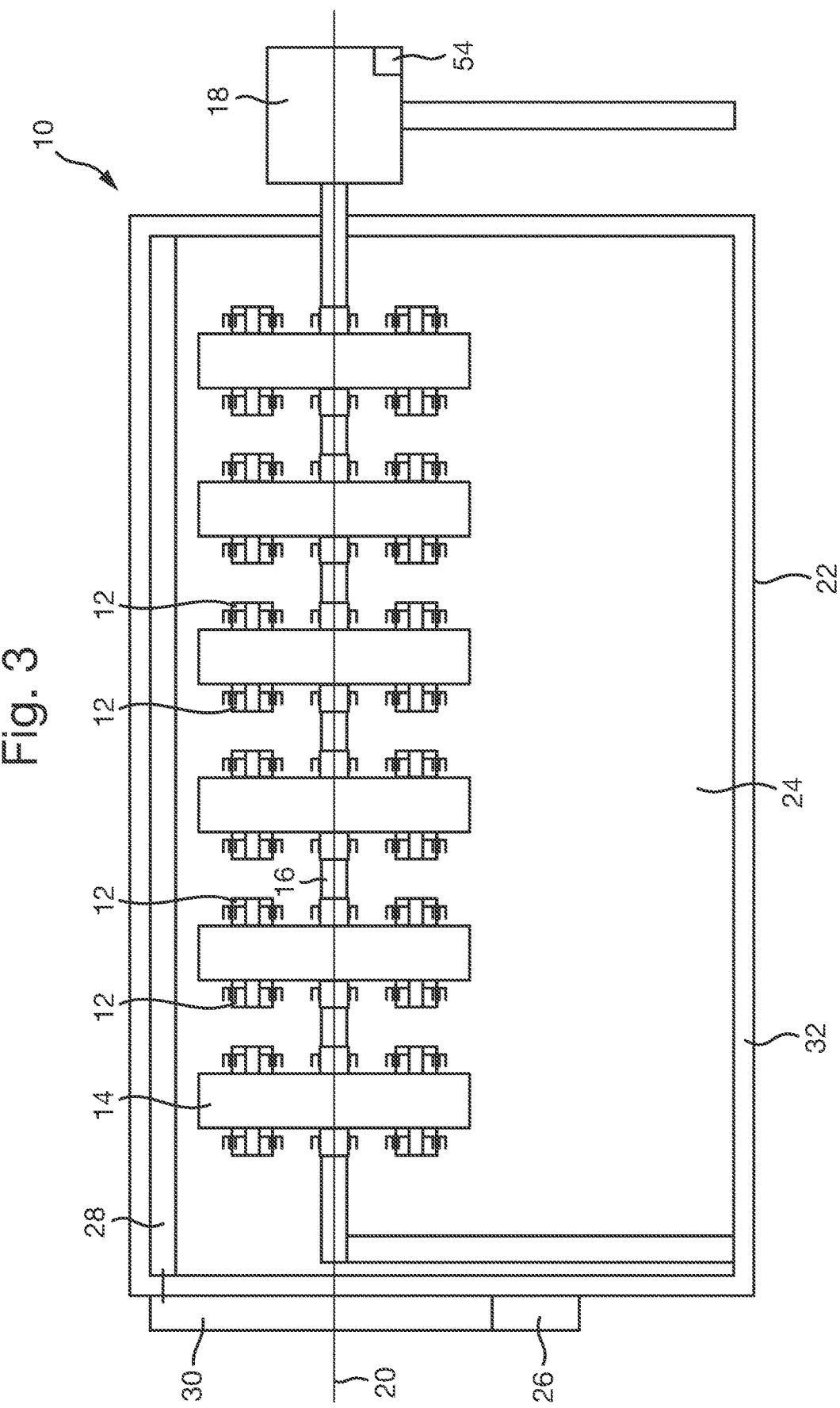
FIG. 3 shows a schematic view of apparatus for carrying out the method.

FIG. 3 shows apparatus 10 suitable for manufacturing a frozen product 1 and which can be used to manufacture other frozen products if desired.

The apparatus 10 comprises a plurality of compartments 12, brackets 14, a drive shaft 16 and a motor 18. The motor 18 is coupled to the drive shaft 16 such that the motor 18 can cause rotation of the drive shaft 16. The compartments 12 are coupled to the bracket 14 which can be driven by the drive shaft 16 to cause the compartment 12 to rotate about an axis 20. In this case the axis 20 about which the compartments 12 rotate extends along the driveshaft 16.

The apparatus 10 further includes a freezer compartment 22 which includes a substantially enclosed volume 24 within which the temperature can be controlled by a freezer controller 26. The controller is coupled to a cooling element 28 within the enclosed volume 24 which can be used to cool the enclosed volume 24. The freezer compartment 22 also includes a heat exchanger 30 outside the enclosed volume 24. The freezer compartment 22 operates on a known refrigeration cycle for example a cycle involving a non-CFC based refrigerant.

The substantially enclosed volume 24 is bounded by an insulated wall 32 through which the drive shaft 16 passes such that the motor 18 is located outside the enclosed volume 24 and the brackets 14 and compartments 12 rotated by the motor are located within the enclosed volume 24. The drive shaft 16 may comprise one or more drive shaft sections to facilitate construction.

The motor 18 is coupled to the driveshaft 16 in such a way as to induce vibration in the driveshaft 16 and hence in the brackets 14 and compartments 12 during rotation of the driveshaft 16. The apparatus 10 includes a controller 54 coupled to the motor 18 for controlling the motor 18.

Figure 4:
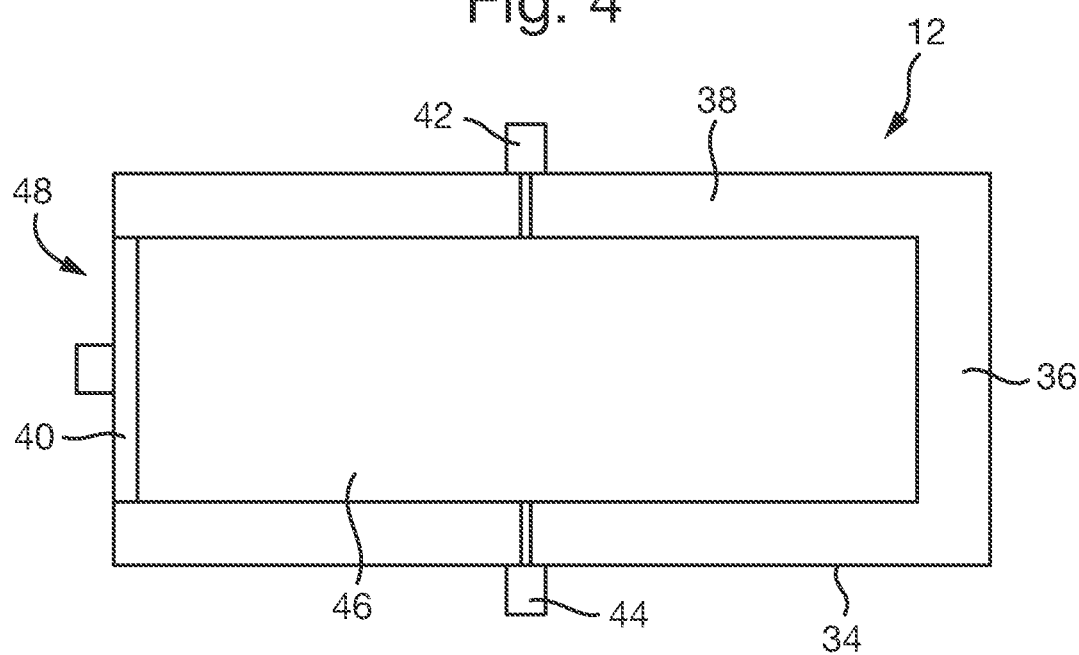
FIG. 4 shows a schematic view of a compartment of the apparatus.

FIG. 4 shows a schematic cross section through a compartment 12. The compartment 12 comprises an insulated wall 34 which forms an end wall 36 and side wall 38 of the compartment 12. The compartment 12 is closed at an open end 48 by a movable seal wall 40, or lid, which is substantially uninsulated as described above. The seal wall 40 may be removable or just movable to allow access to a frozen product within the compartment 12.

An air vent 42 is provided through the side wall 38 and a fill valve 44 is provided through the side wall 38 on the opposite side of the compartment 12 from the air vent 42. This allows the seal wall 40 to seal the compartment 12 after the addition of a suitable quantity of particulates and for a liquid to be filled into the compartment 12 through the fill valve 44 with the displaced air escaping through the air vent 42. This allows an internal volume 46 of the compartment 12 to be substantially filled with liquid if desired.

The cross section of the internal volume 46 of the compartment is substantially constant as it extends away from the seal wall 40, or tapers inwards slightly towards the end wall 36. The seal wall 40 is the same size as, or extends beyond, the cross section of the internal volume at the open end 48. This arrangement of parallel or inwardly tapering walls extending away from an opening that is substantially unobstructed allows a frozen product to be easily removed from the compartment 12.

Figure 5:
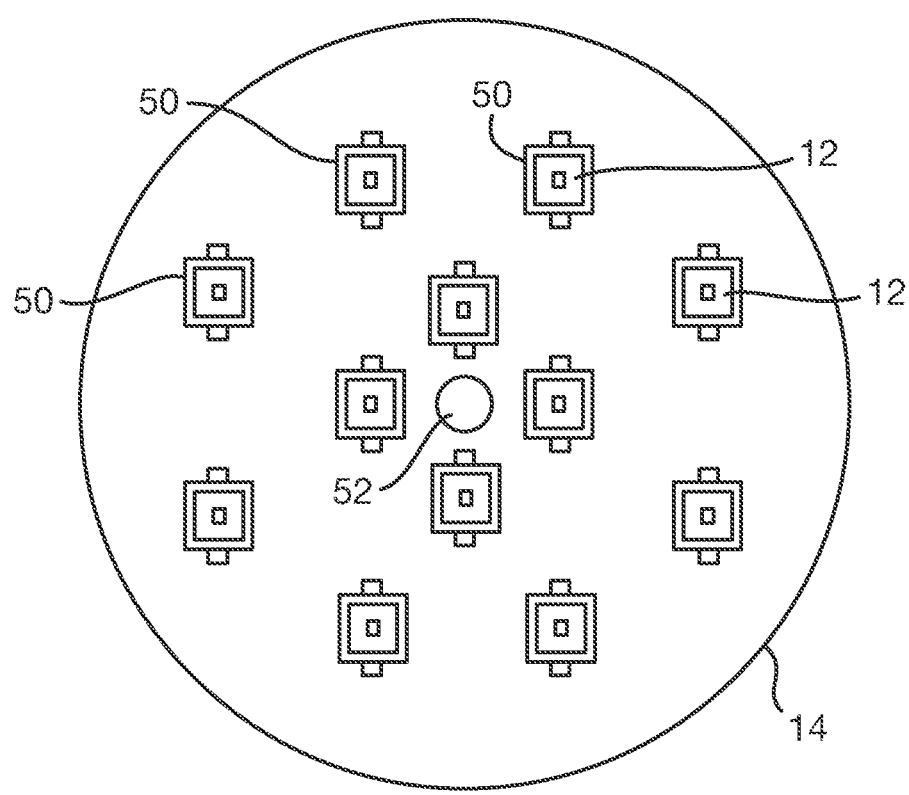
FIG. 5 shows a detailed view of part of the apparatus of FIG. 3.

FIG. 5 shows a schematic view of a bracket 14. The bracket 14 includes a plurality of compartment holders 50, each of which holds a compartment 12. The bracket includes a drive shaft aperture 52 through which the drive shaft 16 to which the bracket 14 is to be attached will pass to allow the bracket 14 and hence the compartments 12 to be rotated about an axis 20.

The compartment holders 50 may be recesses into which at least a part of the compartments 12 fit, or they may include clamping mechanisms for gripping the compartments 12. The compartments 12 may be mounted to the bracket 14 with the uninsulated portion directed away from the bracket 14, for example with their end walls 36 adjacent the bracket 36 and the seal wall 40 directed away from the bracket 14.

To create a frozen product 1 comprising a solid matrix 2 of frozen liquid and particulates 4 distributed throughout the matrix 2 as shown in FIG. 1 particulates 4 are added into a compartment 12 and a liquid which will ultimately form the frozen, solid matrix 2 is charged into the compartment. The liquid can be added through the open end 48 of the compartment 12 before the compartment is sealed, or though the fill valve 44. Depending upon the design of the fill valve 44 it may be possible to add the particulates 4 as a slurry with the liquid through the fill valve 44. The particulates 4 can also be added though the open end 48 of the compartment 12 before the compartment 12 is sealed.

The compartment 12 containing the liquid and particulates 4 is then coupled to the bracket 14 along with other filled compartments 12 if desired. The bracket 14 is coupled to a drive shaft 16 within an enclosed volume 24 of a freezer compartment 22. This coupling can occur before or after the compartments 12 are mounted onto the bracket 14.

The freezer compartment 22 is closed to enclose the volume 24 and the freezer controller 26 is used to activate the cooling element 28 to reduce the temperature within the enclosed volume to a temperature below the freezing temperature of the liquid in the compartments 12.

The motor controller 54 controls the motor 18 to cause rotation of the drive shaft 16 only in a first direction for a first predetermined time and then only in a second, opposite direction, for a second predetermined time. The first and second predetermined times may be separated by a static period during which no rotation takes place and there may be static phases during the first and/or second time periods. The cycle can repeat the same sequence, or with different first, second and static periods.

During the rotation driven by the motor 18 the compartments 12 and the contents thereof are losing heat to the enclosed volume 24. Due to the insulation in the wall 34 of the compartments 12 the compartment cools fastest adjacent the uninsulated wall, in this case the seal wall 40. This preferential cooling at the seal wall 40 end of the compartment 12 results in the seal wall 40 becoming a freeze initiation wall. As a result of the difference in thermal conductivity between the insulated wall 34 and the uninsulated seal wall 40 the liquid within the compartment begins to freeze adjacent the seal wall 40 and the interface between frozen matrix and liquid gradually travels along the compartment 12. This controlled freezing from an initiation wall is referred to as directional freezing and the direction of travel of the freeze interface is preferably substantially parallel with the axis 20 about which the compartment 12 is rotated.

During the directional freezing process described above particulates 4 become trapped in the frozen matrix 2 and, due to the rotation of the compartment 12 and any eddy currents that may be set up within the liquid in the compartment 12, the distribution of those particulates within the matrix 2 is substantially random so the particulates are distributed substantially throughout the matrix.

The directional freezing process also helps to create a clear frozen matrix 2, particularly in water, which expands as it freezes. During a directional freezing process impurities and air bubbles that may cause cloudiness or cracks are not trapped in the centre of the matrix as might occur with a normal freezing process in which all walls are cooled at a similar rate (all have substantially the same level of insulation), but are forced away from the freeze initiation wall meaning that the frozen matrix adjacent the freeze initiation wall comprises less impurities than the average for the bulk liquid.

Once the rotation and cooling process has proceeded for a time period during which it is expected that sufficient of the liquid will have frozen to form the solid matrix the compartments 12 can be removed from the bracket 14 and enclosed volume 24, and the seal wall 40 removed. The frozen product can be extracted through the open end 48 of the compartment 12.

As noted above, the directional freezing process tends to result in a frozen matrix with fewer impurities, and typically therefore greater clarity, at the end of the compartment adjacent the freeze initiation wall. As a result of this it may be desirable to allow only a partial freeze within the compartment so that the frozen matrix remains sufficiently pure for its desired purpose. Alternatively it may be desirable to allow a more complete, or a complete, freeze and then remove a portion of the frozen product furthest from the freeze initiation wall if it is considered to be too impure.

A directional freezing process is illustrated in FIGS. 6, 7, 8a, 8b and 9.

FIG. 6 shows a compartment 12 filled with liquid water 56 and particulates of gold flake 58. The rest of the apparatus 1 is not shown to simplify the figures. As the compartment 12 is cooled during the freezing process the liquid loses heat more rapidly through the uninsulated end seal 40.

Freezing of the water 56 into a frozen matrix of ice 60 begins at the seal wall 40, or freeze initiation wall, as heat is lost more rapidly at this location, and the interface between the ice 60 and water 56 gradually moves along the compartment 12 as the thickness of the ice increases. An intermediate position is shown in FIG. 7. As the ice 60 grows along the compartment 12, along a freeze axis substantially parallel with the axis about which the compartment is rotated and running substantially centrally through the compartment from the freeze initiation wall, gold particulates become randomly trapped in the ice 60. Impurities initially present in the liquid water 56 tend to become concentrated in the remaining liquid water 56 as the pure water has a higher freezing point. This means that the ice formed near the seal wall 40 tends to be more pure than ice formed nearer the end wall 36.

FIGS. 8a and 8b show different possible end points that could be selected for the method of creating a frozen product. In FIG. 8a the freezing process is ended before all the liquid 56 initially present freezes. Particularly for water this allows for easy extraction of a frozen product comprising only ice 60 of sufficient purity to be visually substantially clear and transparent with the impurities that may cause cloudiness in the ice 60 being concentrated in the remaining water 56.

In FIG. 8b the freezing process is continued until substantially all of the liquid water 56 initially present has frozen into ice 60. In this case the ice will have a substantially pure, substantially clear and substantially transparent end which gradually becomes cloudy along the product. Such a product can be supplied to consumers in this graduated form or, as may be preferred, the cloudy end can be removed to leave only a substantially pure, clear and transparent frozen product.

In FIG. 9 the seal wall 40 is shown removed from the compartment and the frozen product 1 extracted and further processed if required, for example by removing cloudy portions, or through additional shaping steps.

The term substantially clear and substantially transparent can be regarded as a subjective test for a manufacturer of the product based upon what will be acceptable for consumers. For a water based product increasing the purity of the initial liquid water will increase the yield of acceptable substantially clear and substantially transparent ice if that is desired. Impurities such as dissolved salts may be deliberately added to provide a visual effect in the final product if desired. If the finished ice product is to be used to chill food it will be understood that such impurities should be edible and may include, for example, vitamins and minerals considered essential, or beneficial, for human health.

Figure 10:
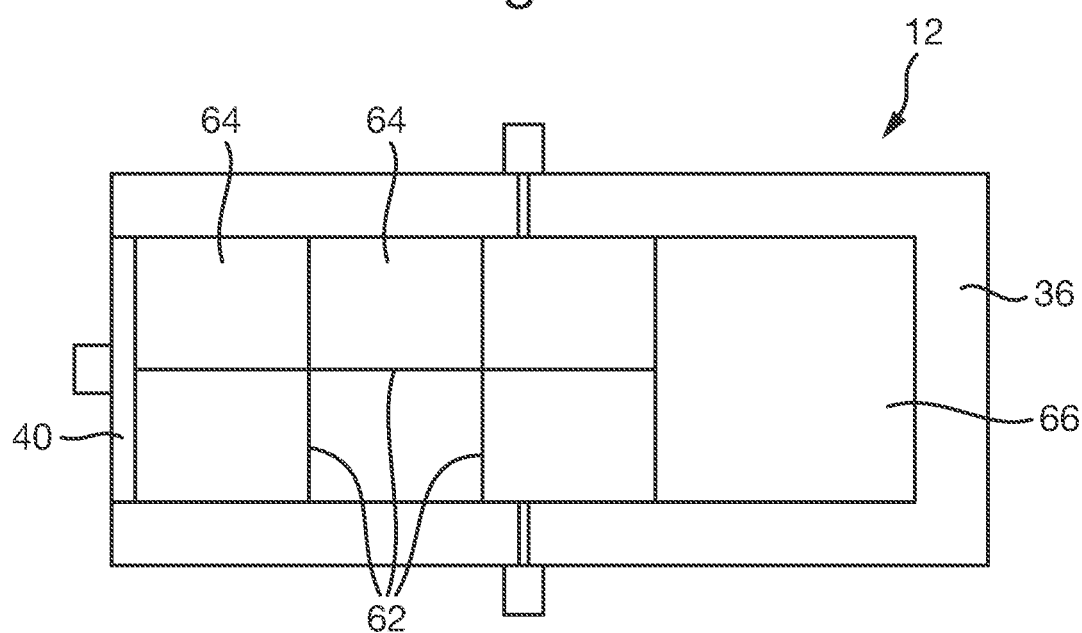
FIG. 10 shows a schematic view of a compartment of the apparatus including internal walls defining sub-compartments.

FIG. 10 shows a schematic cross section through a compartment 12 as shown in FIG. 4. In this case the compartment 12 includes internal walls 62. The internal walls 62 sub-divide the compartment 12 into a plurality of sub-compartments 64, each of which may be individually loaded with a predetermined amount of particulates 58 to produce a desired effect. A waste sub-compartment 66 is left adjacent the end wall 36 furthest from the seal wall 40 in which it is expected that the frozen product may be cloudy. Such a sub-compartment need not be included. In this case there are three sub-compartments 64 between the seal wall 40 and the waste sub-compartment, but in another embodiment there may be only one and the internal walls may subdivide the compartment 12 into cubes having sides of about 35 mm and the waste sub-compartment may be about 20 mm deep.

It should be understood that this method is intended primarily for use with, and has been described mainly in connection with, using liquid water to produce decorative ice cubes. However, the principles described herein, such as rotation, vibration and directional freezing may be applied to the creation of frozen products from different liquids.

The invention claimed is:

1. A method of producing a block of ice throughout which particulates are distributed using an apparatus comprising at least one compartment which is rotatable about an axis and which has an opening which can be sealed by a lid, the method comprising the steps of:
    a) adding to the compartment liquid water to be frozen to form the block of ice and particulates to be distributed therein and sealing the opening using the lid;
    b) reducing the temperature around the compartment to a temperature below the freezing point of the liquid water;
    c) after the sealing, rotating the compartment about the axis while at least some of the water freezes within the compartment trapping at least some of the particulates within the block of ice, wherein the axis about which the compartment rotates is transverse to an axis along which gravity acts and the particulates move through the water under the action of gravity before becoming trapped within the block of ice; and
    d) unsealing the opening of the compartment and removing the block of ice from the compartment through the opening.

2. A method as claimed in claim 1, in which the compartment is bounded by one or more walls, including a freeze initiation wall, at least some of the walls being insulated and the freeze initiation wall being substantially uninsulated such that freezing of the water begins at the freeze initiation wall and progresses through the compartment away from the freeze initiation wall.

3. A method as claimed in claim 1, in which the compartment includes an inlet and an air valve and the method includes the step of adding water through the inlet and allowing air to escape through the air valve.

4. A method as claimed in claim 1, in which step (c) of the method includes rotating the compartment about the axis in one direction for a first predetermined time and then rotating the compartment in the opposite direction for a second predetermined time.

5. A method as claimed in claim 1, in which the rotation occurs at between 0.1 and 60 revolutions per minute.

6. A method as claimed in claim 1, in which the compartment is vibrated during the rotation step.

7. A method as claimed in claim 1, in which the water to be added to the compartment is viscosity adjusted prior to adding into the compartment.

8. A method as claimed in claim 1, in which at least some of the particulates have a maximum dimension of less than 10 mm and are made from one or more metallic leaf materials selected from the group consisting of gold leaf, silver leaf, bronze leaf and copper leaf.

9. A method as claimed in claim 1, in which at least some of the particulates comprise a base material and a coating, the coating modifying an overall density of the particulate from that of the base material of the particulate to substantially match a density of the water.

10. A method as claimed in claim 1, in which the water added to the compartment, produces, when frozen, the block of ice which is substantially transparent such that at least some of the particulates are visible within the block of ice.

11. The apparatus suitable for carrying out the method of claim 1, the apparatus comprising the compartment, a bracket, a drive shaft and a motor, the motor being coupled to the drive shaft such that the motor can cause rotation of the drive shaft, the compartment being coupled to the bracket which can be driven by the drive shaft to cause the compartment to rotate about the axis.

12. The apparatus as claimed in claim 11, in which the apparatus includes a freezer apparatus containing an enclosed volume, the temperature of which can be controlled to be below the freezing point of the water to be frozen.

13. The apparatus as claimed in claim 12, in which the motor is located outside of the enclosed volume of the freezer and the drive shaft passes through a wall of the freezer to the bracket and the compartment within the enclosed volume.

14. A method as claimed in claim 1, in which the apparatus comprises a plurality of the compartments rotatable about the axis.

15. A method as claimed in claim 14, in which the axis is offset from each of the compartments.

16. A method as claimed in claim 1, in which the liquid water added to the compartment in the adding step is at room temperature.

* * * * *